US012630702B2

(12) United States Patent
Kuwajima et al.

(10) Patent No.: US 12,630,702 B2
(45) Date of Patent: May 19, 2026

(54) PARTIALLY FLUORINATED RESIN, MULTILAYER PRODUCT, TUBE, AND METHOD FOR PRODUCING TUBE

(71) Applicant: DAIKIN INDUSTRIES, LTD., Osaka (JP)

(72) Inventors: Yuuki Kuwajima, Osaka (JP); Yukinori Kamiya, Osaka (JP); Takahisa Aoyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 149 days.

(21) Appl. No.: 18/167,445

(22) Filed: Feb. 10, 2023

(65) Prior Publication Data

US 2023/0203295 A1     Jun. 29, 2023

Related U.S. Application Data

(63) Continuation of application No. PCT/JP2021/036299, filed on Sep. 30, 2021.

(30) Foreign Application Priority Data

Sep. 30, 2020    (JP) ................................. 2020-166519

(51) Int. Cl.
| | |
|---|---|
| *C08L 27/18* | (2006.01) |
| *B32B 1/08* | (2006.01) |
| *B32B 27/08* | (2006.01) |
| *B32B 27/30* | (2006.01) |
| *B32B 27/32* | (2006.01) |
| *B32B 27/34* | (2006.01) |
| *C08F 214/26* | (2006.01) |
| *C08L 77/04* | (2006.01) |
| *F16L 11/04* | (2006.01) |

(52) U.S. Cl.
CPC ................ *C08L 27/18* (2013.01); *B32B 1/08* (2013.01); *B32B 27/08* (2013.01); *B32B 27/306* (2013.01); *B32B 27/322* (2013.01); *B32B 27/34* (2013.01); *C08F 214/265* (2013.01); *C08L 77/04* (2013.01); *F16L 11/04* (2013.01); *B32B 2250/03* (2013.01); *B32B 2250/24* (2013.01); *C08F 2800/10* (2013.01)

(58) Field of Classification Search
CPC combination set(s) only.
See application file for complete search history.

(56) References Cited

U.S. PATENT DOCUMENTS

| | | | |
|---|---|---|---|
| 2003/0148125 A1 | 8/2003 | Inaba et al. | |
| 2003/0157335 A1 | 8/2003 | Inaba et al. | |
| 2004/0060642 A1 | 4/2004 | Inaba et al. | |
| 2006/0124190 A1* | 6/2006 | Cheng | B32B 27/322 138/137 |
| 2009/0291243 A1 | 11/2009 | Kitahara et al. | |
| 2014/0246111 A1* | 9/2014 | Zimmer | F16L 9/125 138/140 |
| 2018/0009204 A1 | 1/2018 | Higuchi et al. | |
| 2018/0016430 A1 | 1/2018 | Shibutani et al. | |

FOREIGN PATENT DOCUMENTS

| | | |
|---|---|---|
| CN | 101171128 A | 4/2008 |
| JP | 2003-176394 A | 6/2003 |
| JP | 2006-328195 A | 12/2006 |
| JP | 2007-015364 A | 1/2007 |
| JP | 2010-077213 A | 4/2010 |
| JP | 2014-239742 A | 12/2014 |
| KR | 2002-0086663 A | 11/2002 |
| WO | 2001/058686 A1 | 8/2001 |
| WO | 2001/060606 A1 | 8/2001 |
| WO | 2001/070485 A1 | 9/2001 |
| WO | 2006/004013 A1 | 1/2006 |
| WO | 2016/104726 A1 | 6/2016 |

OTHER PUBLICATIONS

International Search Report for PCT/JP2021/036299 dated Nov. 16, 2021.
International Preliminary Report on Patentability dated Mar. 28, 2023 with a Translation of the Written Opinion of the International Searching Authority in Application No. PCT/JP2021/036299.
Extended European Search Report dated Oct. 1, 2024 from the European Patent Office in Application No. 21875824.1.

* cited by examiner

*Primary Examiner* — Ramsey Zacharia
(74) *Attorney, Agent, or Firm* — Sughrue Mion, PLLC

(57) ABSTRACT

A partially-fluorinated resin having a storage elastic modulus G' of 0.1 Pa or more at a measurement temperature of 230° C. and an angular frequency of 0.0025 rad/second in dynamic viscoelasticity measurement. Also disclosed is a laminate including a partially-fluorinated resin layer containing the partially-fluorinated resin and a non-fluororesin layer containing a non-fluororesin.

6 Claims, No Drawings

PARTIALLY FLUORINATED RESIN, MULTILAYER PRODUCT, TUBE, AND METHOD FOR PRODUCING TUBE

CROSS-REFERENCE TO RELATED APPLICATIONS

This application is a Rule 53(b) Continuation of International Application No. PCT/JP2021/036299 filed Sep. 30, 2021, which claims priority based on Japanese Patent Application No. 2020-166519 filed Sep. 30, 2020, the respective disclosures of which are incorporated herein by reference in their entirety.

TECHNICAL FIELD

The present disclosure relates to a partially-fluorinated resin, a laminate, a tube and a method for producing a tube.

BACKGROUND ART

Tubes famed of a partially-fluorinated resin are known. Laminated tubes famed by laminating a partially-fluorinated resin and other polymers are also known.

As a method for producing such a laminated tube, Patent Literature 1 proposes a method for producing a multilayer laminate in which at least a polyamide (A) and a fluorine-containing ethylenic polymer (B) are laminated by a simultaneous multilayer coextrusion method using a coextrusion apparatus composed of a die and a plurality of extruders that supply resins to the die to obtain a laminate constituted by the polyamide (A) and fluorine-containing ethylenic polymer (B), wherein the temperature of the die is set within a range of higher than 260° C. and 310° C. or less.

CITATION LIST

Patent Literature

Patent Literature 1: WO2001/070485

SUMMARY

One embodiment of the present disclosure provides a partially-fluorinated resin having a storage elastic modulus G' of 0.1 Pa or more at a measurement temperature of 230° C. and an angular frequency of 0.0025 rad/second in melt viscoelasticity measurement.

Effect

The present disclosure can provide a partially-fluorinated resin from which a tube having a smooth inner surface can be obtained even when a tube is produced by extruding at a high line speed.

DESCRIPTION OF EMBODIMENTS

Specific embodiments of the present disclosure will now be described in detail below, but the present disclosure is not limited to the following embodiments.

A first partially-fluorinated resin of the present disclosure has a storage elastic modulus G' of 0.1 Pa or more at a measurement temperature of 230° C. and an angular frequency of 0.0025 rad/second in melt viscoelasticity measurement.

The transport pressure of fuel to be supplied to engines has increased in recent years in order to reduce fuel consumption. As the fuel transport pressure increases, the fuel transport pressure varies larger. Thus, tubes for use in fuel transport are required to have enhanced crack resistance, and partially-fluorinated resins for use in fuel tubes are also required to have crack resistance.

The production method described in Patent Literature 1 can provide a multilayer laminate of which layers are adhered by employing a relatively high die temperature. However, for reasons such as exposure of the partially-fluorinated resin to a relatively high die temperature and different melt viscosities of the polymer materials constituting the layers, the inner surface of a tube to be obtained tends to become rough, and the thickness of a tube tends to vary. Particularly in the case of extruding at a high line speed, these disadvantages may become noticeable.

Accordingly, a partially-fluorinated resin is demanded which is excellent in crack resistance as well as enables a tube having a smoother inner surface to be obtained even when a tube is produced by extruding at a high line speed.

An intensive study thus has been made on a means for solving the above problems, and it has been found that use of a partially-fluorinated resin having a high storage elastic modulus as a material for extrusion forming enables a tube to be produced, the tube being excellent in crack resistance as well as having a smooth inner surface even in the case of extruding at a high line speed. Further, a method for producing a partially-fluorinated resin having a high storage elastic modulus also has been found. The partially-fluorinated resin of the present disclosure has been completed based on these findings.

A first partially-fluorinated resin of the present disclosure has a storage elastic modulus G' of 0.1 Pa or more at a measurement temperature of 230° C. and an angular frequency of 0.0025 rad/second in melt viscoelasticity measurement. The storage elastic modulus G' is a value measured as follows.

The dependence of the storage elastic modulus on the angular frequency from 100 rad/second to 0.001 rad/second is measured. The measurement frequency is 5 points/digit at logarithmically equal intervals, the measurement jig is a parallel plate having a diameter of 25 mm, the sample thickness is 0.8 mm (during measurement), the measurement temperature is 230° C., and the amount of strain is 3%.

When the storage elastic modulus G' is 0.1 Pa or more, excellent crack resistance can be obtained while high moldability is maintained.

In respect that superior crack resistance can be obtained, the storage elastic modulus G' is preferably 0.15 Pa or more, more preferably 0.20 Pa or more, even more preferably 0.23 Pa or more, and still even more preferably 0.25 Pa or more, and is preferably 10 Pa or less, more preferably 3 Pa or less, even more preferably 1.0 Pa or less, and still even more preferably 0.5 Pa or less.

The storage elastic modulus (G') of the partially-fluorinated resin can be adjusted by optimizing the kind of polymerization initiator, timing of addition of the polymerization initiator during polymerization, and the like in production of a partially-fluorinated resin by polymerizing a monomer in the presence of a polymerization initiator.

A second partially-fluorinated resin of the present disclosure mentioned below preferably has a high storage elastic modulus G' similarly as the first partially-fluorinated resin of the present disclosure. The storage elastic modulus G' of the second partially-fluorinated resin of the present disclosure can have a storage elastic modulus G' similar to that of the first partially-fluorinated resin of the present disclosure. When the storage elastic modulus (G') of the first partially-fluorinated resin of the present disclosure is within the above range and the critical shear rate thereof is within a range mentioned below, the crack resistance and high moldability can be simultaneously achieved at an even higher level.

The critical shear rate at 260° C. of the second partially-fluorinated resin of the present disclosure is within a range of 50 to 500 sec$^{-1}$.

The production method described in Patent Literature 1 can provide a multilayer laminate of which layers are adhered by employing a relatively high die temperature. However, for reasons such as exposure of the partially-fluorinated resin to a relatively high die temperature and different melt viscosities of the polymer materials constituting the layers, the inner surface of a tube to be obtained tends to become rough, and the thickness of a tube tends to vary. Particularly in the case of extruding at a high line speed, these disadvantages may become noticeable.

Accordingly, a partially-fluorinated resin is demanded which enables a tube having a smoother inner surface to be obtained even when a tube is produced by extruding at a high line speed.

The critical shear rate at 260° C. of the second partially-fluorinated resin of the present disclosure is within a range of 50 to 500 sec$^{-1}$. When the critical shear rate is within the above range, a tube having a smooth inner surface can be obtained even when a tube is produced by extruding at a high line speed.

The critical shear rate is a shear rate at which a melt fracture begins to occur in a partially-fluorinated resin flowing out from an orifice having a diameter of 1 mm and a length of 16 mm at 260° C. under a specific shear stress using a capillary rheometer.

The upper limit of the critical shear rate, if within the range mentioned above, preferably can be set to 300 sec$^{-1}$, and a more preferable lower limit thereof is 130 sec$^{-1}$ in respect of excellent thin moldability.

The storage elastic modulus G' and critical shear rate of the partially-fluorinated resin can be adjusted by optimizing the kind and amount of polymerization initiator, timing of addition of the polymerization initiator during polymerization, polymerization time, and the like in production of a partially-fluorinated resin by polymerizing a monomer to constitute the partially-fluorinated resin in the presence of a polymerization initiator.

Hereinafter, characteristics common to the first and second partially-fluorinated resin of the present disclosure will be described.

The partially-fluorinated resin of the present disclosure preferably has a reactive functional group. The partially-fluorinated resin of the present disclosure, when having a reactive functional group, can be extruded at a high line speed and simultaneously exhibits high adhesion to other materials. Accordingly, use of a partially-fluorinated resin having a reactive functional group enables laminates and multilayer tubes having an excellent interlayer adhesive strength to be produced with high productivity. Although the position of the above reactive functional group in the polymer is not limited, it is more preferable to have the reactive functional group at a main-chain end and/or in a side chain of the polymer of the partially-fluorinated resin. The reactive functional group is preferably at least one selected from the group consisting of a carbonyl group, a hydroxyl group, a heterocyclic group, and an amino group.

In the present disclosure, the "carbonyl group" is a divalent carbon group including a carbon-oxygen double bond, and is typified by —C(=O)—. The reactive functional group containing the carbonyl group is not limited, and examples include those containing a carbonyl group as a part of the Chemical structure, such as a carbonate group, a carboxylic acid halide group (a halogenoformyl group), a formyl group, a carboxyl group, an ester bond (—C(=O)O—), an acid anhydride bond (—C(=O)O—C(=O)—), an isocyanate group, an amide group, an imide group (—C(=O)—NH—C(=O)—), a urethane bond (—NH—C(=O)O—), a carbamoyl group (NH$_2$—C(=O)—), a carbamoyloxy group (NH$_2$—C(=O)O—), a ureido group (NH$_2$—C(=O)—NH—), and an oxamoyl group (NH$_2$—C(=O)—C(=O)—).

In the amide group, the imide group, the urethane bond, the carbamoyl group, the carbamoyloxy group, the ureido group, the oxamoyl (oxamyl) group, and the like, a hydrogen atom bonded to the nitrogen atom thereof may be replaced with a hydrocarbon group such as an alkyl group.

In terms of the ease of introduction and in terms of suitable heat resistance and good adhesion at a relatively low temperature of the partially-fluorinated resin, the reactive functional group is preferably an amide group, a carbamoyl group, a hydroxyl group, a carboxyl group, a carbonate group, a carboxylic acid halide group, and an acid anhydride bond, and more preferably an amide group, a carbamoyl group, a hydroxyl group, a carbonate group, a carboxylic acid halide group, and an acid anhydride bond.

The reactive functional group, in particular, is preferably at least one selected from the group consisting of a carbonate group and a carboxylic halide group. The carbonate group and carboxylic halide group may be groups described in International Publication No. WO 99/45044.

The partially-fluorinated resin may be a polymer having a reactive functional group either at a main-chain end or in a side chain of the polymer, or may be a polymer having a reactive functional group both at a main-chain end and in a side chain. When the polymer has a reactive functional group at a main-chain end, the polymer may have a reactive functional group at both ends of the main chain, or may have a reactive functional group only at one end. When the reactive functional group also has an ether bond, the polymer may further have the reactive functional group in the main chain.

The partially-fluorinated resin is preferably a polymer having a reactive functional group at a main-chain end because it does not impair mechanical properties and chemical resistance remarkably or because it is advantageous in terms of productivity and cost.

The number of the above reactive functional groups is suitably selected according to the difference in the kind of an adjacent layer, shape, purpose of adhering, application, required adhesion, and an adhering method with an adjacent layer.

The number of reactive functional groups is preferably 3 to 800, more preferably 15 or more, even more preferably 30 or more, particularly preferably 50 or more, preferably 400 or less, and more preferably 300 or less per 10$^6$ main-chain carbon atoms, in respect that further higher adhesion can be obtained. When the partially-fluorinated resin of the present disclosure has at least one selected from the group consisting of a carbonate group and a carboxylic halide group, the total number of carbonate groups and carboxylic halide groups is preferably 3 to 800, more preferably 15 or more, even more preferably 30 or more, particularly preferably 50 or more, preferably 400 or less, and more preferably 300 or less per 10$^6$ main-chain carbon atoms.

The number of reactive functional groups can be determined in the following manner: a film sheet having a thickness of 50 to 200 μm obtained by compression-molding a partially-fluorinated resin at a molding temperature 50-100° C. higher than the melting point thereof under a molding pressure of 5 MPa is analyzed for an infrared absorption spectrum using an infrared spectrophotometer; the obtained infrared absorption spectrum is compared with the infrared absorption spectrum of a known film to determine the type of characteristic absorption of the reactive functional group; and the number is calculated from spectral differences according to the following formula.

Number of reactive functional groups (per $10^6$ main-chain carbon atoms)=(l×K)/t l: Absorbance K: Correction factor t: Film thickness (mm)

Table 1 shows the correction factors for the end reactive functional groups of interest.

TABLE 1

| End group | Absorption frequency (cm$^{-1}$) | Corrections factor |
|---|---|---|
| —OC(=O)O—R | 1817 | 1426 |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction factors in Table 1 are values that have been determined from the infrared absorption spectra of model compounds in order to calculate the reactive functional groups per $10^6$ main-chain carbon atoms.

The carboxylic halide group may decompose into a carboxylic acid due to heating or the like during formation of the partially-fluorinated resin or over time. Thus, it should be considered that the partially-fluorinated resin generally contains, in addition to a carbonate and/or carboxylic halide group, a carboxylic acid group derived therefrom.

Examples of methods for introducing the reactive functional group into the main-chain and/or side-chain end include a method involving copolymerizing a monomer (β) containing the reactive functional group to introduce the reactive functional group, a method involving using a compound having or producing the reactive functional group as a polymerization initiator, a method involving using a compound having or producing the reactive functional group as a chain transfer agent, and a method involving introducing the reactive functional group into a fluoropolymer by way of a polymer reaction, and a method involving these methods in combination.

The monomer (β) containing the reactive functional group for introducing the reactive functional group by copolymerization is not limited as long as it is a monomer that is copolymerizable with a monomer yielding a partially-fluorinated resin and that has the reactive functional group. Specific examples are as follows:

First examples of the monomer (β) include aliphatic unsaturated carboxylic acids described in International Publication No. WO 2005/100420. The unsaturated carboxylic acids preferably have at least one polymerizable carbon-carbon unsaturated bond within one molecule and at least one carbonyloxy group (—C(=O)—O—) within one molecule.

The aliphatic unsaturated carboxylic acid may be an aliphatic unsaturated monocarboxylic acid, or may be an aliphatic unsaturated polycarboxylic acid having two or more carboxyl groups. Examples of the aliphatic unsaturated monocarboxylic acid include unsaturated aliphatic monocarboxylic acids having 3 to 6 carbon atoms, such as (meth)acrylic acid and crotonic acid.

Examples of the aliphatic unsaturated polycarboxylic acid include unsaturated aliphatic polycarboxylic acids having 3 to 6 carbon atoms, such as maleic acid, fumaric acid, itaconic acid, citraconic acid, mesaconic acid, aconitic acid, maleic anhydride, itaconic anhydride, and citraconic anhydride.

Second examples of the monomer (β) include unsaturated compounds represented by the formula:

$$CX_2^7 = CY^1 - \left(Rf^4\right)_n - Z^2$$

wherein $Z^2$ is the above reactive functional group; $X^7$ and $Y^1$ are the same or different and are a hydrogen atom or a fluorine atom; $Rf^4$ is an alkylene group having 1 to 40 carbon atoms, a fluorine-containing oxyalkylene group having 1 to 40 carbon atoms, a fluorine-containing alkylene group having an ether bond and having 2 to 40 carbon atoms, or a fluorine-containing oxyalkylene group having an ether bond and having 2 to 40 carbon atoms; and n is 0 or 1.

The content of the unit introduced by copolymerization from the monomer (β) containing the reactive functional group is preferably 0.05 mol % or more, and more preferably 0.1 mol % or more. When the content is excessive, gelation and a vulcanization reaction likely occur during thermal melting, and thus the upper limit of the content of the monomer (β) unit is preferably 5 mol %, and more preferably 3 mol %.

Various methods can be employed in order to obtain a partially-fluorinated resin having a carboxylic halide group. For example, such a partially-fluorinated resin can be obtained by pyrolyzing (decarbonizing) the partially-fluorinated resin having a carbonate group mentioned above by heating. The heating temperature depends on the kind of carbonate group and the kind of partially-fluorinated resin, but heating is made such that the temperature of the polymer itself reaches 270° C. or more, preferably 280° C. or more, and particularly preferably 300° C. or more. The upper limit of the heating temperature is preferably made to be equal to or less than the pyrolysis temperature of the portion of the partially-fluorinated resin other than the carbonate group.

The partially-fluorinated resin may have a heterocyclic group or an amino group at the main-chain end or the side-chain end of the polymer.

The heterocyclic group has a hetero atom (such as a nitrogen atom, a sulfur atom, or an oxygen atom) within the ring of its hetero ring moiety, may be a saturated ring or an unsaturated ring, and may be a single ring or a condensed ring. The heterocyclic group is preferably an oxazolyl group.

The amino group is a monovalent functional group obtained by removing hydrogen from ammonia or a primary or secondary amine. Specifically, the amino group is a group represented by, for example, the formula:

$$-NR^1R^2$$

wherein $R^1$ and $R^2$ may be the same or different, and are a hydrogen atom or a monovalent organic group having 1 to 20 carbon atoms. Specific examples of the amino group include —NH$_2$, —NH(CH$_3$), —N(CH$_3$)$_2$, —NH(CH$_2$CH$_3$), —N(C$_2$H$_5$)$_2$, and —NH(C$_6$H$_5$).

The melting point of the partially-fluorinated resin is not limited, and is preferably 150° C. or more, more preferably 170° C. or more, even more preferably 180° C. or more, particularly preferably 190° C. or more, preferably less than 324° C., more preferably 320° C. or less, even more preferably 300° C. or less, particularly preferably 280° C. or less, and most preferably 260° C. or less.

The melt flow rate (MFR) of the partially-fluorinated resin at an arbitrary temperature (for example, 265° C. or 297° C.) within the range of about 230 to 350° C., which is the molding temperature range of partially-fluorinated resins in general, is preferably 0.5 g/10 min or more, more preferably 1.0 g/10 min or more, even more preferably 1.5 g/10 min or more, particularly preferably 2.0 g/10 min or more, most preferably 2.5 g/10 min or more, preferably 100 g/10 min or less, more preferably 50 g/10 min or less, even more preferably 40 g/10 min or less, and particularly preferably 35 g/10 min or less. For example, preferable is a partially-fluorinated resin having a melt flow rate at 265° C. of 5 to 30 g/10 min.

The melt flow rate can be identified by measuring the mass (g) of the partially-fluorinated resin flowing out from a nozzle having an inner diameter of 2 mm and a length of 8 mm per unit time (10 minutes) at an arbitrary temperature (for example, 265° C. or 297° C.) under an arbitrary load (for example, 2.16 kg or 5 kg) using a melt indexer, for example.

The partially-fluorinated resin of the present disclosure is a partially crystalline fluoropolymer, and is not a fluoroelastomer but a fluoroplastic. The partially-fluorinated resin has a melting point and has thermoplasticity. The partially-fluorinated resin may be melt-fabricable or may be non melt-processible. In respect that a tube can be produced by melt extrusion forming with high productivity, the partially-fluorinated resin is preferably a melt-fabricable partially-fluorinated resin.

The "partially-fluorinated resin" in the present disclosure", different from a perfluoropolymer in which all the hydrogen atoms bonded to carbon atoms that constitute the main chain are replaced with fluorine atoms, means a polymer in which hydrogen atoms bonded to carbon atoms that constitute the main chain are partially replaced with fluorine atoms. Accordingly, a perhalopolymer in which hydrogen atoms bonded to carbon atoms that constitute the main chain are partially replaced with fluorine atoms and all the rest of the hydrogen polymers are replaced with chlorine atoms is included in the partially-fluorinated resin.

In the present disclosure, melt-fabricability means that the polymer can be melted and processed using a conventional processing device such as an extruder and an injection molding machine. Accordingly, the melt-fabricable partially-fluorinated resin usually has a melt flow rate of 0.01 to 500 g/10 min.

Examples of the melt-fabricable partially-fluorinated resin include a tetrafluoroethylene (TFE)/ethylene copolymer [ETFE], a TFE/ethylene/hexafluoropropylene (HFP) copolymer, a chlorotrifluoroethylene (CTFE)/ethylene copolymer [ECTFE], polyvinylidene fluoride [PVdF], polychlorotrifluoroethylene [PCTFE], a CTFE/TFE copolymer, a TFE/vinylidene fluoride (VdF) copolymer [VT], polyvinyl fluoride [PVF], a TFE/VdF/CTFE copolymer [VTC], and a TFE/HFP/VdF copolymer.

The partially-fluorinated resin may have a polymerization unit based on other monomers in such a range of amount that essential characteristics of each partially-fluorinated resin are not impaired. The other monomers can be suitably selected from, for example, TFE, HFP, ethylene, propylene, perfluoro(alkyl vinyl ether), perfluoroalkyl ethylene, hydrofluoroolefin, fluoroalkyl ethylene, perfluoro(alkyl aryl ether), and the like.

The partially-fluorinated resin is preferably at least one selected from the group consisting of a TFE/ethylene copolymer [ETFE], a TFE/ethylene/HFP copolymer, a chlorotrifluoroethylene (CTFE)/ethylene copolymer [ECTFE], polychlorotrifluoroethylene [PCTFE], and a CTFE/TFE copolymer, more preferably at least one selected from the group consisting of a TFE/ethylene copolymer [ETFE], a TFE/ethylene/HFP copolymer, and a CTFE/TFE copolymer, and even more preferably at least one selected from the group consisting of a TFE/ethylene copolymer [ETFE] and a TFE/ethylene/HFP copolymer.

In the present disclosure, the content of each monomer unit of the partially-fluorinated resin can be calculated by suitably combining NMR, E1-IR, an elemental analysis, and an X-ray fluorescence analysis according to the kind of monomer.

ETFE is a copolymer containing ethylene unit and tetrafluoroethylene unit. Introduction of ethylene unit and TFE unit to a copolymer allows the crack resistance of the partially-fluorinated resin to be further enhanced, additionally enables a tube having a smoother inner surface to be obtained, and also facilitates production of a laminate by laminating with other materials. ETFE is preferably a copolymer having a molar ratio of TFE unit to ethylene unit (TFE unit/ethylene unit) of 20/80 or more and 90/10 or less. A more preferable molar ratio is 37/63 or more and 85/15 or less, and an even more preferable molar ratio is 38/62 or more and 80/20 or less. The ETFE may be a copolymer composed of TFE, ethylene, and a monomer copolymerizable with TFE and ethylene. Examples of the copolymerizable monomer include monomers represented by the following formulas: CH$_2$=CX$^5$Rf$^3$, CF$_2$=CFRf$^3$, CF$_2$=CFORf$^3$, and CH$_2$=C(Rf$^3$)$_2$, wherein X$^5$ represents H or F, and Rf$^3$ represents a fluoroalkyl group that may contain an ether bond. Of these, preferable is at least one selected from the group consisting of fluorine-containing vinyl monomers represented by CF$_2$=CFRf$^3$, CF$_2$=CFORf$^3$, and CH$_2$=CX$^5$Rf$^3$, more preferable is at least one selected from the group consisting of HFP, perfluoro(alkyl vinyl ethers) represented by CF$_2$=CF—ORf$^4$, wherein Rf$^4$ represents a perfluoroalkyl group having 1 to 5 carbon atoms, and fluorine-containing vinyl monomers represented by CH$_2$=CX$^5$Rf$^3$, wherein Rf$^3$ represents a perfluoroalkyl group having 1 to 8 carbon atoms, and even more preferable is HFP. The monomer copolymerizable with TFE and ethylene may be an aliphatic unsaturated carboxylic acid such as itaconic acid and itaconic anhydride. The content of the monomer unit copolymerizable with TFE and ethylene in ETFE is preferably 0.1 to 10 mol %, more preferably 0.1 to 5 mol %, and particularly preferably 0.2 to 4 mol %.

The TFE/ethylene copolymer is also preferably a TFE/ethylene/HFP copolymer containing a polymerization unit based on HFP (HFP unit). The mass ratio of TFE/ethylene/HFP in the TFE/ethylene/HFP copolymer is preferably 40 to 65/30 to 60/0.5 to 20 and more preferably 40 to 65/30 to 60/0.5 to 10.

The melting point of ETFE, is preferably 150° C. or more, more preferably 170° C. or more, even more preferably 180° C. or more, particularly preferably 190° C. or more, preferably less than 324° C., more preferably 320° C. or less, even more preferably 300° C. or less, particularly preferably 270° C. or less, and most preferably 260° C. or less.

The MFR (297° C.) of ETFE, is preferably 0.5 g/10 min or more, more preferably 1.0 g/10 min or more, even more preferably 1.5 g/10 min or more, particularly preferably 2.0 g/10 min or more, most preferably 2.5 g/10 min or more, preferably 100 g/10 min or less, more preferably 50 g/10 min or less, even more preferably 40 g/10 min or less, and particularly preferably 5 g/10 min or less. The MFR of ETFE, is measured at a temperature of 297° C. under a load of 5 kg.

As ETFE, the ethylene/tetrafluoroethylene copolymer described in Japanese Patent Laid-Open No. 2019-90013 is also suitably used.

The ethylene/CTFE copolymer (ECTFE) is a copolymer containing ethylene unit and CTFE unit. Preferably, the ethylene unit is 46 to 52 mol %, and the CTFE unit is 54 to 48 mol %, based on the total of the ethylene unit and the CTFE unit. ECTFE may be a binary copolymer composed solely of ethylene unit and CTFE unit and may further contain a polymerization unit based on a monomer copolymerizable with ethylene and CTFE (for example, a fluoro-alkyl vinyl ether (PAVE) derivative).

The content of a polymerization unit based on a monomer copolymerizable with ethylene and CTFE is preferably 0.01 to 5 mol % based on the total of the ethylene unit, the CTFE unit, and the polymerization unit based on the copolymerizable monomer.

The MFR of ECTFE (230° C.) is preferably 0.5 to 100 g/10 min. The MFR of ECTFE is measured at a temperature of 230° C. under a load of 2.16 kg.

The CTFE/TFE copolymer contains CTFE unit and TFE unit. The CTFE/TFE copolymer is particularly preferably a copolymer containing CTFE unit, TFE unit, and a monomer (α) unit derived from a monomer (α) copolymerizable therewith.

The monomer (α) is not limited as long as it is a monomer copolymerizable with CTFE and TFE, and examples include ethylene (Et), VdF, perfluoro(alkyl vinyl ether) [PAVE] represented by $CF_2$=$CF$—$ORf^1$ (wherein $Rf^1$ is a perfluoroalkyl group having 1 to 8 carbon atoms), a vinyl monomer represented by $CX^3X^4$=$CX^5(CF_2)_nX^6$ (wherein $X^3$, $X^4$, and $X^5$ are the same or different and a hydrogen atom or a fluorine atom; $X^6$ is a hydrogen atom, a fluorine atom, or a chlorine atom; n is an integer of 1 to 10), and an alkyl perfluorovinyl ether derivative represented by $CF_2$=$CF$—$OCH_2$—$Rf^2$ (wherein $Rf^2$ is a perfluoroalkyl group having 1 to 5 carbon atoms). In particular, at least one selected from the group consisting of PAVE, the vinyl monomer, and the alkyl perfluorovinyl ether derivative is preferable, and at least one selected from the group consisting of PAVE and HFP is more preferable.

PAVE is preferably perfluoro(alkyl vinyl ether) represented by $CF_2$=$CF$—$ORf^3$ (wherein $Rf^3$ represents a perfluoroalkyl group having 1 to 5 carbon atoms), such as perfluoro(methyl vinyl ether) [PMVE], perfluoro(ethyl vinyl ether) [PEVE], perfluoro(propyl vinyl ether) [PPVE], and perfluoro (butyl vinyl ether), more preferably at least one selected from the group consisting of PMVE, PEVE, and PPVE, and even more preferably PPVE.

In the alkyl perfluorovinyl ether derivative, $Rf^2$ is preferably a perfluoroalkyl group having 1 to 3 carbon atoms, and more preferably $CF_2$=$CF$—$OCH_2$—$CF_2CF_3$.

As for the ratio of the CTFE unit to the TFE unit in the CTFE/TFE copolymer, preferably, the CTFE unit is 15 to 90 mol %, and the TFE unit is 85 to 10 mol %. More preferably, the CTFE unit is 15 to 50 mol %, and the TFE unit is 85 to 50 mol %. Even more preferably, the CTFE unit is 15 to 25 mol %, and the TFE unit is 85 to 75 mol %.

The CTFE/TFE copolymer preferably has 90 to 99.9 mol % of the CTFE unit and the TFE unit in total and 0.1 to 10 mol % of the monomer (α) unit. When the monomer (α) unit is less than 0.1 mol %, moldability, environmental stress crack resistance, and fuel crack resistance are likely poor, and when exceeding 10 mol %, fuel barrier properties, heat resistance, and mechanical properties tend to be poor.

The CTFE/TFE copolymer is particularly preferably a CTFE/TFE/PAVE copolymer.

Examples of PAVE in the CTFE/TFE/PAVE copolymer include perfluoro(methyl vinyl ether) [PMVE], perfluoro (ethyl vinyl ether) [PEVE], perfluoro(propyl vinyl ether) [PPVE], and perfluoro(butyl vinyl ether). In particular, at least one selected from the group consisting of PMVE, PEVE, and PPVE is preferable, and PPVE is more preferable.

In the CTFE/TFE/PAVE copolymer, the PAVE unit is preferably 0.5 mol % or more and preferably 5 mol % or less, based on all monomer units.

The melting point of the CTFE/TFE copolymer is preferably 120° C. or more, more preferably 140° C. or more, even more preferably 150° C. or more, particularly preferably 160° C. or more, most preferably 190° C. or more, preferably less than 324° C., more preferably 320° C. or less, and even more preferably 270° C. or less.

The MFR (297° C.) of the CTFE/TFE copolymer is preferably 0.5 g/10 min or more, more preferably 2.0 g/10 min or more, even more preferably 3.0 g/10 min or more, particularly preferably 4.0 g/10 min or more, most preferably 5 g/10 min or more, preferably 100 g/10 min or less, more preferably 50 g/10 min or less, even more preferably 40 g/10 min or less, and particularly preferably 35 g/10 min or less. The MFR of the CTFE/TFE copolymer is measured at a temperature of 297° C. under a load of 5 kg.

The partially-fluorinated resin of the present disclosure has a fold number measured by MIT test as measured in accordance with ASTM D-2176 of preferably 10,000 or more, more preferably 30,000 or more, even more preferably 50,000 or more, particularly preferably 70,000 or more, and most preferably 80,000 or more. A famed article including the partially-fluorinated resin of the present disclosure is excellent in bending resistance, and thus the MIT thereof can be within the above range. The partially-fluorinated resin of the present disclosure has an excellent mechanical strength and has particularly excellent crack resistance.

In the present disclosure, the MIT is a value obtained by repeating folding under conditions in accordance with ASTM D-2176 using an MIT-type folding endurance fatigue tester and measuring the number of folds to break. The conditions are described in Examples.

The partially-fluorinated resin can be produced by polymerizing a fluorine-containing monomer that is to constitute the partially-fluorinated resin by a polymerization method such as suspension polymerization, solution polymerization, emulsion polymerization, or bulk polymerization. The polymerization method is preferably emulsion polymerization or suspension polymerization and more preferably suspension polymerization. In the polymerization, conditions such as temperature and pressure as well as a polymerization initiator and other additives can be suitably set according to the composition and amount of the partially-fluorinated resin.

The polymerization initiator to be used can be an oil-soluble radical polymerization initiator or a water-soluble radical polymerization initiator, and an oil-soluble radical polymerization initiator is preferable.

The oil-soluble radical polymerization initiator may be a known oil-soluble peroxide, and representative examples thereof include:

dialkyl peroxycarbonates such as di-n-propyl peroxydicarbonate, diisopropyl peroxydicarbonate, di-sec-butyl peroxydicarbonate, and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro (or fluorochloro)acyl] peroxides.

Examples of the di[fluoro (or fluorochloro)acyl] peroxides include diacyl peroxides represented by [(RfCCO)—]$_2$, wherein Rf is a perfluoroalkyl group, an ω-hydroperfluoroalkyl group, or a fluorochloroalkyl group.

Examples of the di[fluoro (or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di (perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorotriacontafluorodocosanoyl) peroxide.

The water-soluble radical polymerization initiator may be a known water-soluble peroxide, and examples thereof include ammonium salts, potassium salts, and sodium salts of persulfuric acid, perboric acid, perchloric acid, peiphosphoric acid, and percarbonic acid, organic peroxides such as disuccinic acid peroxide and diglutaric acid peroxide, t-butyl permalate, and t-butyl hydroperoxide. A reducing agent such as a sulfite may be used in combination with the peroxide, and the amount thereof to be used may be 0.1 to 20 times the amount of the peroxide.

In polymerization, a surfactant, a chain transfer agent, and a solvent may be used, and conventionally known ones each may be used.

As the surfactant, a known surfactant may be used, and examples thereof that can be used include nonionic surfactants, anionic surfactants, and cationic surfactants. Of these, a fluorine-containing anionic surfactant is preferable, and a linear or branched fluorine-containing anionic surfactant having 4 to 20 carbon atoms that may contain ether-bonded oxygen (that is, an oxygen atom is inserted between carbon atoms) is more preferable. The amount of the surfactant to be added (with respect to polymerization water) is preferably 50 to 5,000 ppm.

Examples of the chain transfer agent include hydrocarbons such as ethane, isopentane, n-hexane, and cyclohexane; aromatics such as toluene and xylene; ketones such as acetone; acetic acid esters such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount of the chain transfer agent to be added depends on the magnitude of the chain transfer constant of the compound to be used, and the chain transfer agent is usually used in the range of 0.01 to 20% by mass with respect to the polymerization solvent.

Examples of the solvent include water and mixed solvent of water and alcohol.

In suspension polymerization, a fluorinated solvent may be used in addition to water. Examples of the fluorinated solvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; hydrofluoroalkanes such as $CF_3CFHCFHCF_2CF_2CF_3$, $CF_2HCF_2CF_2CF_2CF_2H$, and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2CCH_2F$, $(CF_3)_2CHCF_2OCH_3$, $CF_3CF_2CH_2CCH_2CHF_2$, and $CF_3CHFCF_2OCH_2CF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$, and of these, perfluoroalkanes are preferable. The amount of the fluorinated solvent to be used is preferably 10 to 100% by mass with respect to an aqueous medium in respect of suspendability and economic efficiency.

The polymerization temperature may be, but is not limited to, 0 to 100° C. The polymerization pressure is suitably determined according to the kind and amount of solvent to be used and other polymerization conditions such as vapor pressure and polymerization temperature, and usually may be 0 to 9.8 MPaG.

The partially-fluorinated resin of the present disclosure may be in any form and may be in the form of an aqueous dispersion, powder, pellets, or the like.

The partially-fluorinated resin of the present disclosure (or a composition containing the partially-fluorinated resin of the present disclosure) may contain various additives, e.g., electroconductive materials, reinforcing agents, fillers, UV absorbers, and pigments as long as the object of the present disclosure is not impaired. Use of such additives enables the properties of the partially-fluorinated resin to increase, such as electric conductivity, surface hardness, abrasion resistance, electrostatic properties, and weather resistance.

The partially-fluorinated resin of the present disclosure (or a composition containing the partially-fluorinated resin of the present disclosure) substantially includes no stabilizer such as a heat stabilizer, specifically cuprous oxide (copper (I) oxide), cupric oxide (copper (II) oxide), cuprous iodide, and cupric iodide. "Substantially includes no" means that cuprous oxide (copper (I) oxide), cupric oxide (copper (II) oxide), cuprous iodide, and cupric iodide are not positively added.

The laminate of the present disclosure comprises a partially-fluorinated resin layer containing the above first and/or second partially-fluorinated resin and a non-fluororesin layer containing a non-fluororesin.

The partially-fluorinated resin layer is a layer containing the above first and/or second partially-fluorinated resin. The laminate of the present disclosure, which comprises the partially-fluorinated resin layer, comprises firmly adhered layers as well as is excellent in crack resistance, oil resistance, fuel barrier properties, chemical resistance, low chemical solution permeability, heat resistance, weather resistance, contamination resistance, and the like. The above partially-fluorinated resin is excellent in moldability, and thus when the partially-fluorinated resin layer containing the partially-fluorinated resin is located as the outermost layer of the laminate, the surface of the laminate is excellent in smoothness.

The partially-fluorinated resin layer may further contain an electroconductive filler in addition to the partially-fluorinated resin. When the electroconductive filler is contained, it is possible to prevent build-up of static electricity resulting from, for example, friction between fuel or a chemical solution and the laminate of the present disclosure, and thus prevent fire or explosion that may occur due to electrostatic discharge, or cracks or holes in the laminate of the present disclosure and fuel leakage resulting therefrom.

The electroconductive filler is not limited, and examples include powders of electroconductive simple substances or fibers of electroconductive simple substances such as metal and carbon; powders of electroconductive compounds such as zinc oxide; and powders having the surface which has been subjected to electroconductive treatment.

The powders of electroconductive simple substances or the fibers of electroconductive simple substances are not limited, and examples include metal powders of copper, nickel, and the like; metal fibers of iron, stainless steel, and the like; and carbon black, carbon fiber, carbon fibril described in, for example, Japanese Patent Laid-Open No. 3-174018, carbon nanotube, carbon nanohorn, and acetylene black and the like.

The powders having the surface which has been subjected to electroconductive treatment are powders obtained by performing electroconductive treatment on the surface of non-electroconductive powders such as glass beads and titanium oxide. A method for the electroconductive treatment is not limited, and examples include metal sputtering and electroless plating. Among the electroconductive fillers described above, carbon black is advantageous in view of economy and is thus preferably used.

The content of the electroconductive filler is suitably determined according to the kind of partially-fluorinated resin, the electroconductive performance required of a laminate, the molding conditions, and the like, and is preferably 1 to 30 parts by mass based on 100 parts by mass of the partially-fluorinated resin. A more preferable lower limit is 5 parts by mass, and a more preferable upper limit is 20 parts by mass.

In addition to the electroconductive filler, the partially-fluorinated resin layer may contain various additives, e.g., reinforcing agents, fillers, UV absorbers, and pigments as long as the object of the present disclosure is not impaired. Use of such additives enables the properties of the partially-fluorinated resin layer to increase, such as surface hardness, abrasion resistance, electrostatic properties, and weather resistance.

The non-fluororesin layer is a layer containing a non-fluororesin. The laminate of the present disclosure, because of comprising the non-fluororesin layer, exerts excellent effects obtained by comprising the non-fluororesin layer, in addition to excellent effects obtained by comprising the partially-fluorinated resin layer.

Examples of the non-fluororesin include resins that have excellent mechanical strength and can primarily serve to maintain pressure resistance and the shape of a molded body (hereinafter referred to as structural member-type resins) such as a polyamide resin, a polyolefin-based resin, a vinyl chloride-based resin, a polyurethane resin, a polyester resin, a polyaramid resin, a polyimide resin, a polyamide-imide resin, a polyphenylene oxide resin, a polyacetal resin, a polycarbonate resin, an acryl-based resin, a styrene-based resin, an acrylonitrile/butadiene/styrene resin [ABS], a cellulose-based resin, a polyether ether ketone resin [PEEK], a polysulfone resin, a polyether sulfone resin [PES], and a polyetherimide resin; and resins having high permeation resistance to fuel and gas (hereinafter referred to as permeation resistant resins) such as an ethylene/vinyl alcohol copolymer resin, a polyphenylene sulfide resin, a polybutylene naphthalate resin, a polybutylene terephthalate resin, and polyphthalamide [PPA].

The non-fluororesin, in particular, is preferably at least one selected from the group consisting of a polyamide resin, an ethylene/vinyl alcohol copolymer resin, and a polyolefin-based resin, more preferably at least one selected from the group consisting of a polyamide resin and an ethylene/vinyl alcohol copolymer resin, and even more preferably a polyamide resin.

The laminate of the present disclosure has excellent mechanical strength when the non-fluororesin layer contains the structural member-type resin, and the laminate of the present disclosure has excellent permeation resistance to fuel when the non-fluororesin layer contains the permeation resistant resin.

The polyamide resin is a polymer having an amide bond [—NH—C(=O)—] as a repeating unit within the molecule.

The polyamide resin may be any of a so-called nylon resin, which is a polymer in which an amide bond within the molecule is bonded to an aliphatic structure or an alicyclic structure, and a so-called aramid resin, which is a polymer in which an amide bond within the molecule is bonded to an aromatic structure.

The polyamide resin (nylon resin) is not limited, and examples include polymers such as polyamide 6, polyamide 66, polyamide 11, polyamide 12, polyamide 610, polyamide 1010, polyamide 612, polyamide 6/66, polyamide 66/12, polyamide 46, a metaxylylenediamine/adipic acid copolymer, polyamide 62, polyamide 92, polyamide 122 and polyamide 142, and aromatic polyamide such as polyamide 6T and polyamide 9T. Two or more of these may be used in combination.

The aramid resin is not limited, and examples include polyparaphenylene terephthalamide and polymetaphenylene isophthalamide.

The polyamide resin may be a polymer in which a structure without an amide bond as a repeating unit is block-copolymerized or graft-copolymerized with a part of the molecule. Examples of such polyamide resins include polyamide-based elastomers such as a polyamide 6/polyester copolymer, a polyamide 6/polyether copolymer, a polyamide 12/polyester copolymer, and a polyamide 12/polyether copolymer. These polyamide-based elastomers are obtained by block copolymerization of a polyamide oligomer and a polyester oligomer via an ester bond, or obtained by block copolymerization of a polyamide oligomer and a polyether oligomer via an ether bond. Examples of the polyester oligomer include polycaprolactone and polyethylene adipate, and examples of the polyether oligomer include polyethylene glycol, polypropylene glycol, and polytetramethylene glycol. The polyamide-based elastomer is preferably a polyamide 6/polytetramethylene glycol copolymer or a polyamide 12/polytetramethylene glycol copolymer.

Preferably the polyamide resin is, in particular, polyamide 6, polyamide 66, polyamide 11, polyamide 12, polyamide 610, polyamide 1010, polyamide 612, polyamide 62, polyamide 6/66, polyamide 66/12, a polyamide 6/polyester copolymer, a polyamide 6/polyether copolymer, a polyamide 12/polyester copolymer, a polyamide 12/polyether copolymer, or the like, in view of obtaining sufficient mechanical strength even when the layer famed of the polyamide resin is thin. Two or more of these may be used in combination.

The amine value of the polyamide resin is preferably 10 to 80 (eq/$10^6$ g). When the amine value is within the above range, excellent interlayer adhesion can be obtained even in the case of coextrusion at a relatively low temperature. When the amine value is less than 10 (eq/$10^6$ g), interlayer adhesion may be insufficient. When the amine value exceeds 80 (eq/$10^6$ g), the mechanical strength of the laminate is insufficient, and coloration likely occurs during storage, resulting in poor handleability. A more preferable lower limit is 15 (eq/$10^6$ g) and an even more preferable lower limit is 23 (eq/$10^6$ g), and a more preferable upper limit is 60 (eq/$10^6$ g) and an even more preferable upper limit is 50 (eq/$10^6$ g).

In the present disclosure, the amine value is a value obtained by thermally dissolving 1 g of a polyamide resin in 50 ml of m-cresol and titrating this solution with 1/10 N aqueous p-toluenesulfonic acid solution using thymol blue as an indicator. The amine value means the amine value of the polyamide resin before laminating unless specified otherwise. Among the amino groups of the polyamide resin before laminating, some are considered to be consumed for adhesion to the adjacent layer; however, since the amount of consumed amino groups is very small relative to the entire layer. For this reason, the amine value of the polyamide resin before laminating and the amine value of the laminate of the present disclosure are substantially comparable.

The polyolefin-based resin is a resin having a monomer unit derived from a vinyl group-containing monomer that does not have a fluorine atom. The vinyl group-containing monomer that does not have a fluorine atom is not limited, and preferably has the above-described reactive functional group in applications in which interlayer adhesion is required.

The polyolefin-based resin is not limited, and examples include polyolefins such as polyethylene, polypropylene, high-density polyolefin, and low-density polyolefin, and also modified polyolefins obtained by modifying the above polyolefins with maleic anhydride or the like, epoxy-modified polyolefins, and amine-modified polyolefins. Among these, high-density polyolefin is preferable.

The ethylene/vinyl alcohol copolymer resin is obtained by saponifying an ethylene/vinyl acetate copolymer obtained from ethylene and vinyl acetate. The content ratio between ethylene and vinyl acetate to be copolymerized is suitably determined according to the proportion of the number of moles of the vinyl acetate unit to be specified by a formula mentioned below.

A preferable ethylene/vinyl alcohol copolymer resin is one in which the vinyl acetate unit X mol % and the saponification degree Y % satisfy X×Y/100≥7. If X×Y/100<7, interlayer adhesion may be insufficient. X×Y/100≥10 is more preferable. The value of X×Y/100 is a measure of a content of the hydroxyl group included by the ethylene/vinyl alcohol copolymer resin, and a larger value of X×Y/100 means a higher content of the hydroxyl group included by the ethylene/vinyl alcohol copolymer resin.

The hydroxyl group is a group that may involve in adhesion with a counterpart material to be laminated with the EVOH layer. A higher content of the hydroxyl group in the ethylene/vinyl alcohol copolymer resin causes the interlayer adhesion in the laminate to increase. In the present disclosure, the "counterpart material to be laminated" described above refers to a material laminated contiguously.

In the present disclosure, the "vinyl acetate unit X mol %" is the proportion of the number of moles of vinyl acetate [Ni] derived from vinyl acetate unit with respect to the total number of moles [N] of ethylene and vinyl acetate added in the molecule of the ethylene/vinyl alcohol copolymer resin, meaning the average value of the molar content Xi represented by the following formula:

$$Xi \ (\%) = (Ni/N) \times 100.$$

The vinyl acetate unit X mol % is a value obtained by measurement using infrared absorption spectroscopy [IR].

In the present disclosure, the "vinyl acetate unit" is a portion on the molecular structure of the ethylene/vinyl alcohol copolymer resin, meaning the portion derived from vinyl acetate. The vinyl acetate unit may be saponified and have a hydroxyl group or may not be saponified and have an acetoxy group.

The "saponification degree" is a percentage representing the proportion of the number of saponified vinyl acetate units with respect to the total of the number of saponified vinyl acetate unit and number of unsaponified vinyl acetate units. The saponification degree is a value obtained by measuring using infrared absorption spectroscopy [IR].

Examples of an ethylene/vinyl alcohol copolymer resin in which X and Y satisfy the formula described above include commercially available products such as EVAL F101 (manufactured by Kuraray Co., Ltd., vinyl acetate unit X=68.0 mol %; saponification degree Y=95%; X×Y/100=64.6), Melthene H6051 (manufactured by TOSOH CORPORATION, vinyl acetate unit X=11.2 mol %; saponification degree Y=100%; X×Y/100=11.2), and TECHNO-LINK K200 (manufactured by Taoka Chemical Co., Ltd., vinyl acetate unit X=11.2 mol %; saponification degree Y=85%; X×Y/100=9.52).

A preferable ethylene/vinyl alcohol copolymer resin has a MFR at 200° C. of 0.5 to 100 g/10 min. A case in which the MFR is less than 0.5 g/10 min or more than 100 g/10 min is not preferable because the difference between the melt viscosity of the ethylene/vinyl alcohol copolymer resin and the melt viscosity of the counterpart material tends to increase and thus unevenness may occur in the thickness of each layer. The preferable lower limit is 1 g/10 min, and the preferable upper limit is 50 g/10 min.

The non-fluororesin preferably has a melting point of 50 to 400° C. The lower limit is more preferably 100° C. and even more preferably 150° C. The upper limit is more preferably 300° C. and even more preferably 250° C.

The melting point is obtained as a temperature corresponding to the maximum value in the heat-of-fusion curve when the temperature is raised at a rate of 10° C./min using a differential scanning calorimeter (DSC) (manufactured by Seiko Instruments Inc.).

The non-fluororesin layer may contain various additives, e.g., stabilizers such as heat stabilizers, reinforcing agents, fillers, UV absorbers, and pigments as long as the object of the present disclosure is not impaired. Use of such additives enables the properties of the non-fluororesin to increase, such as thermal stability, surface hardness, abrasion resistance, electrostatic properties, and weather resistance.

The laminate of the present disclosure preferably comprises a partially-fluorinated resin layer and a polyamide resin layer containing a polyamide resin as a non-fluororesin layer. In the laminate of the present disclosure, the partially-fluorinated resin layer and the polyamide resin layer are preferably directly adhered because excellent interlayer adhesive strength is obtained without providing an adhesive layer or the like. Examples of the laminate of the present disclosure include a laminate comprising a partially-fluorinated resin layer/a polyamide resin layer as the innermost layer/outermost layer. A laminate comprising a partially-fluorinated resin layer and a polyamide resin layer can combine excellent properties included by the partially-fluorinated resin, such as oil resistance, fuel barrier properties, chemical resistance, low chemical solution permeability, heat resistance, weather resistance, and contamination resistance and properties included by the polyamide resin, such as high strength, high toughness, lightweight and excellent processability, and in particular, flexibility.

When the polyamide resin has the amine value mentioned above, the partially-fluorinated resin layer and the polyamide resin layer can be adhered particularly firmly. The interlayer adhesive strength between the partially-fluorinated resin layer and the polyamide resin layer is preferably 30 N/cm or more.

The interlayer adhesive strength is determined by conducting a 180° delamination test using a Tensilon Universal Tester at a speed of 25 mm/min.

The laminate of the present disclosure preferably comprises a partially-fluorinated resin layer and an ethylene/vinyl alcohol copolymer (EVOH) layer containing an EVOH resin. The laminate comprising a partially-fluorinated resin layer and an EVOH layer can combine excellent properties included by the partially-fluorinated resin, such as oil resistance, fuel barrier properties, chemical resistance, low chemical solution permeability, heat resistance, weather resistance, and contamination resistance and properties included by the EVOH such as fuel barrier properties and low chemical solution permeability.

The laminate of the present disclosure more preferably further comprises a polyamide resin layer in addition to the partially-fluorinated resin layer and EVOH layer because excellent interlayer adhesive strength is obtained and excellent properties of the 3 resins are obtained. In the laminate of the present disclosure, it is preferred that the partially-fluorinated resin layer and the polyamide resin layer be directly adhered and the polyamide resin layer and the EVOH layer be directly adhered because excellent interlayer adhesive strength is obtained without providing an adhesive layer or the like.

Examples of the laminate of the present disclosure include:

a laminate comprising a partially-fluorinated resin layer/a polyamide resin layer as innermost layer/outermost layer, a laminate comprising a partially-fluorinated resin layer/an EVOH layer/a polyamide resin layer and a laminate comprising a partially-fluorinated resin layer/a polyamide resin layer/a EVOH layer, as innermost layer/intermediate layer/outermost layer, a laminate comprising a partially-fluorinated resin layer/a polyamide resin layer/an EVOH layer/a polyamide resin layer as innermost layer/inner layer/intermediate layer/outermost layer, a laminate comprising a partially-fluorinated resin layer/a polyamide resin layer/an EVOH layer/a polyamide resin layer/a polyamide resin layer and a laminate comprising a partially-fluorinated resin layer/a polyamide resin layer/an EVOH layer/a polyamide resin layer/a polyolefin resin layer, as innermost layer/inner layer/intermediate layer/outer layer/outermost layer, and a laminate comprising a partially-fluorinated resin layer/a polyamide resin layer/a polyamide resin layer/an EVOH layer/a polyamide resin layer/a polyamide resin layer, a laminate comprising a partially-fluorinated resin layer/a polyamide resin layer/an EVOH layer/a polyamide resin layer/a polyamide resin layer/a polyolefin resin layer, a laminate comprising a partially-fluorinated resin layer/a polyamide resin layer/an EVOH layer/a polyamide resin layer/a polyolefin resin layer/a polyamide resin layer, and a laminate comprising a partially-fluorinated resin layer/a partially-fluorinated resin layer/a polyamide resin layer/an EVOH layer/a polyamide resin layer/a polyolefin resin layer, as innermost layer/inner layer 1/inner layer 2/intermediate layer/outer layer/outermost layer.

When the laminate of the present disclosure comprises two kinds or more partially-fluorinated resin layers, the partially-fluorinated resins contained in each layer may be of the same or different kind. When the laminate of the present disclosure comprises two or more kinds of polyamide resin layers, the polyamide resins contained in each layer may be of the same or different kind. When the laminate of the present disclosure comprises two or more kinds of EVOH layers, the ethylene/vinyl alcohol copolymers contained in each layer may be of the same or different kind. In the laminate of the present disclosure, the boundary between the layers that are in contact does not necessarily need to be clear, and the laminate may have a layer structure having a concentration gradient in which the molecular chains of the polymers forming the respective layers mutually enter the layers from the surfaces in contact with each other.

The laminate of the present disclosure may have another layer. The thickness, shape, and the like of each layer of the laminate of the present disclosure may be suitably selected according to the purpose of use, the situation of use, and the like.

A monolayer tube (hose) of the present disclosure contains the partially-fluorinated resin described above. A multilayer tube (hose) of the present disclosure is famed of the laminate described above. In any tube, the inner surface of the tube is preferably famed of the partially-fluorinated resin described above. The partially-fluorinated resin described above, which has a specific storage elastic modulus or critical shear rate, is excellent in forming fabricability and enables the inner surface of a tube famed of the partially-fluorinated resin to be markedly smooth. The surface roughness Ra of the inner surface of the tube is 1.0 μm or less, for example, preferably 0.5 μm or less, more preferably 0.2 μm or less, and may be 0.01 μm or more. The surface roughness can be measured in accordance with JIS B0601-1994.

The tube of the present disclosure, whether the tube is a monolayer tube or multilayer tube famed of a laminate, is excellent in the forming fabricability of the partially-fluorinated resin, and thus the thickness of the tube is uniform. The difference between the maximum value and the minimum value of the thickness of the tube is, for example, 5% or less with respect to the maximum value of the thickness.

The outer diameter of the tube is preferably 2 to 20 mm, more preferably 3 mm or more, even more preferably 4 mm or more, most preferably 6 mm or more, more preferably 18 mm or less, even more preferably 16 mm or less, and most preferably 14 mm or less.

The inner diameter of the tube is preferably 1 to 15 mm, more preferably 2 mm or more, even more preferably 3 mm or more, most preferably 4 mm or more, more preferably 13 mm or less, even more preferably 11 mm or less, and most preferably 10 mm or less.

The thickness (the difference between the outer diameter and the inner diameter) of the tube is preferably 0.5 to 8 mm, more preferably 0.6 to 6 mm, even more preferably 0.6 to 4 mm, and most preferably 0.7 to 2 mm.

The thickness of the partially-fluorinated resin layer in the laminate and the tube is preferably 0.05 to 0.4 mm, more preferably 0.06 to 0.3 mm, and even more preferably 0.07 to 0.25 mm. When the laminate and the tube comprise two or more partially-fluorinated resin layers, the thickness of the partially-fluorinated resin layer is the total thickness of the layers.

The thickness of the non-fluororesin layer in the laminate and the tube is preferably 0.05 to 4 mm, more preferably 0.1 to 3 mm, and even more preferably 0.5 to 2 mm. When the laminate and the tube comprises two or more non-fluororesin layers, the thickness of the non-fluororesin layer is the total thickness of the layers.

When the laminate and the tube have a two-layer structure of innermost layer/outermost layer, the thickness of the innermost layer is preferably 0.05 to 0.4 mm, more preferably 0.06 to 0.3 mm, and even more preferably 0.07 to 0.25 mm. The thickness of the outermost layer is preferably 0.05 to 4 mm, more preferably 0.1 to 3 mm, and even more preferably 0.5 to 2 mm.

When the laminate and the tube has a five-layer structure of innermost layer/inner layer/intermediate layer/outer layer/outermost layer, the thickness of the innermost layer is preferably 0.01 to 0.5 mm, more preferably 0.02 to 0.25 mm, and even more preferably 0.03 to 0.15 mm.

The thickness of the inner layer is preferably 0.01 to 1.0 mm, more preferably 0.03 to 0.5 mm, and even more preferably 0.05 to 0.3 mm.

The thickness of the intermediate layer is preferably 0.01 to 0.5 mm, more preferably 0.02 to 0.25 mm, and even more preferably 0.03 to 0.15 mm.

The thickness of the outer layer is preferably 0.01 to 1.0 mm, more preferably 0.03 to 0.5 mm, and even more preferably 0.05 to 0.3 mm.

The thickness of the outermost layer is 0.01 to 1.0 mm, more preferably 0.03 to 0.7 mm, and even more preferably 0.05 to 0.5 mm.

The partially-fluorinated resin of the present disclosure, which is excellent in crack resistance, oil resistance, fuel barrier properties, chemical resistance, low chemical solution permeability, heat resistance, weather resistance, contamination resistance, and the like, can be used in various fields such as semiconductor, automobile, construction, electric and electronic, chemical plant, and pharmaceutical-related fields. The partially-fluorinated resin of the present disclosure has high adhesion to other materials. Even when a tube is produced by extruding at a high line speed, use of the partially-fluorinated resin of the present disclosure enables a tube to be obtained which comprises firmly adhered layers, has a smooth inner surface, and additionally has a uniform thickness. The partially-fluorinated resin of the present disclosure can be extruded not only at a high line speed but also at a low line speed. Accordingly, the partially-fluorinated resin of the present disclosure can be suitably used particularly for laminates and tubes.

The partially-fluorinated resin of the present disclosure can be famed to obtain various molded articles such as films, sheets, tubes (hoses), bottles, and tanks. Molded articles containing the partially-fluorinated resin of the present disclosure are excellent in crack resistance, oil resistance, fuel barrier properties, chemical resistance, low chemical solution permeability, heat resistance, weather resistance, contamination resistance, and the like.

The laminate of the present disclosure can have various shapes such as a film shape, a sheet shape, a tube (hose)

shape, a bottle shape, and a tank shape. The film shape, the sheet shape, the tube shape, and the hose shape may have a wavy shape, a corrugated shape, a convoluted shape, or the like.

The tube (hose) may have a wavy shape, a corrugated shape, a convoluted shape, or the like. When the tube (hose) has a wavy shape, having a region in which a plurality of annular ridges and grooves in a wavy form are provided, one side of the annulus can be compressed and the other side can be expanded outward in that region, which enables ease of bending the laminate by a desired angle without causing stress fatigue or interlayer delamination.

The method of forming the wavy region is not limited, and the wavy region can be easily famed by creating a straight tube and then, for example, mold-shaping the tube into a predetermined wavy shape or the like.

Examples of a method for forming the partially-fluorinated resin include, but are not limited to, a heat compression molding method, a transfer molding method, an extrusion forming method, an injection molding method, and a calender molding method. For forming, molding machines for fluoropolymers commonly used such as an injection molding machine, a blow molding machine, an extruder, and various coating machines can be used to produce molded products and laminates of various shapes such as a sheet shape and a tube shape. Forming methods such as multilayer extrusion forming, multilayer blow molding, and multilayer injection molding can produce multilayer molded products such as multilayer tubes, multilayer hoses, and multilayer tanks.

Examples of the method for producing the laminate of the present disclosure include:

(1) a method involving forming a laminate having a multilayer structure in one step by coextruding the polymers that foim the respective layers to thermally fuse (melt-adhere) the layers (coextrusion molding);

(2) a method involving laminating the layers that are separately prepared by an extruder and adhering the layers by thermal fusion;

(3) a method involving forming a laminate by extruding by an extruder, onto the surface of a layer prepared in advance, a polymer that forms a layer to be adjacent to the aforementioned layer; and (4) a method involving electrostatically coating the surface of a layer prepared in advance with a polymer that forms a layer to be adjacent to the aforementioned layer, and then heating the resulting coated product entirely or from the coated side to thermally melt the polymer subjected to coating, to thereby formula layer.

When the laminate of the present disclosure is a tube or a hose, a method corresponding to the above (2) is (2a) a method involving separately forming each cylindrical layer by an extruder and coating the layer to be an inner layer with the other layer as a heat-shrinkable tube to be in contact with the inner layer; a method corresponding to the above (3) is (3a) a method involving, first, forming a layer to be an inner layer by an inner-layer extruder and forming a layer that is to be in contact with the aforementioned layer on the outer circumferential surface thereof by an outer-layer extruder; and a method corresponding to the above (4) is (4a) a method involving electrostatically applying a polymer for forming an inner layer to the inside of a layer to be in contact with the inner layer, and then placing the resulting coated product in a heating oven to heat the coated product entirely or inserting a rod-shaped heating device into the cylindrical coated product to heat the cylindrical coated product from inside, to thereby thermally melting and molding the polymer for the inner layer.

As long as each layer of the laminate and the tube of the present disclosure can be coextruded, the laminate is generally famed by the coextrusion molding of the above (1). Examples of the coextrusion molding include conventionally known multi-layer coextrusion production methods such as a multi-manifold method and a feed block method.

In the molding methods (2) and (3) above, after each layer is famed, the surface of each layer that comes into contact with another layer may be surface-treated in order to increase interlayer adhesion. Examples of such surface treatment include etching treatment such as sodium etching treatment; corona treatment; and plasma treatment such as low-temperature plasma treatment.

As a method for molding the laminate of the present disclosure, it is also possible to use a molding method involving laminating a plurality of materials in multiple stages by rotational molding. In this case, the melting point of the outer-layer material does not necessarily need to be higher than the melting point of the inner-layer material, and the melting point of the inner-layer material may be 100° C. or more higher than the melting point of the outer-layer material. In this case, preferably there is also a heating part inside.

The laminate and tube of the present disclosure, which have a specific storage elastic modulus and critical shear rate and contain a partially-fluorinated resin excellent in forming fabricability, can be produced by extruding the partially-fluorinated resin at a high line speed. The line speed is preferably 15 m/min or more, more preferably 20 m/min or more, and may be 100 m/min or less. The laminate of the present disclosure, even if obtained by forming at such a high line speed, comprises firmly adhered layers and has a smooth surface. The tube of the present disclosure, even if obtained by forming at such a high line speed, has a smooth inner surface. The laminate and the tube of the present disclosure also can be produced by extruding a partially-fluorinated resin at a low line speed. The line speed may be 8 to 100 m/min, for example.

The laminate and tube of the present disclosure can be produced by forming a partially-fluorinated resin and other materials as required using an extruder. As the extruder, an extruder comprising a cylinder, an adapter, and a spiral multimanifold die or crosshead die equipped with a die head and a die chip can be used, but is not limited thereto.

An extruder usually comprises a hopper, a screw, a cylinder, an adapter (a connecting portion for the screw and a die), and a die. An extruder comprising a screw may be a single screw extruder or a twin screw extruder. Volatile components generated from the partially-fluorinated resin also can be removed by providing the cylinder with a vent hole to open the vent hole or reduce the pressure.

The cylinder temperature is preferably 150 to 350° C. and more preferably 180 to 330° C. The die temperature is preferably 230 to 330° C. and more preferably 250 to 320° C. The chip temperature is preferably 230 to 330° C. and more preferably 250 to 320° C. A laminate having a smoother surface or a tube having a smoother inner surface can be obtained by setting the die temperature and the chip temperature within the range described above. Particularly when a polyamide resin or an ethylene/vinyl alcohol copolymer resin is coextruded with a partially-fluorinated resin (for example, ETFE) to produce a laminate or a multilayer tube, the die temperature and the chip temperature described above are preferably set as described above in order to obtain a laminate having a smoother surface or a tube having a smoother inner surface.

The partially-fluorinated resin, laminate, and tube of the present disclosure can be used in the following applications.

Films and sheets: such as food films, food sheets, chemical films, release films, chemical sheets, agricultural films, diaphragms of diaphragm pumps, and various packings, tubes and hoses: such as chemical solution tubes or chemical solution hoses, coating material tubes or coating material hoses (including printer applications), fuel tubes or fuel hoses such as automobile fuel tubes or automobile fuel hoses, solvent tubes or solvent hoses, automobile radiator hoses, air conditioner hoses, brake hoses, wire claddings, food and beverage tubes or food and beverage hoses, underground tubes or hoses for gas stations, and submarine oil field tubes or hoses (including injection tubes and crude oil transfer tubes), bottles, containers, and tanks: such as automobile radiator tanks, fuel tanks such as gasoline tanks, solvent tanks, coating material tanks, chemical solution containers such as semiconductor chemical solution containers, and food and beverage tanks, and others: such as various automobile seals such as carburetor flange gaskets and fuel pump O-rings, various machine-related seals such as hydraulic equipment seals, gears, medical tubes (including catheters), and cableway pipes.

Embodiments have been described above, but it will be understood that various changes in forms and details can be made without departing from the gist and the scope of the claims.

One embodiment of the present disclosure provides a partially-fluorinated resin having a storage elastic modulus $G'$ of 0.1 Pa or more at a measurement temperature of 230° C. and an angular frequency of 0.0025 rad/second in melt viscoelasticity measurement.

Another embodiment of the present disclosure provides a partially-fluorinated resin having a critical shear rate at 260° C. within a range of 50 to 500 $\sec^{-1}$.

The partially-fluorinated resin preferably has a reactive functional group.

The partially-fluorinated resin preferably has a fold number measured by MIT test as measured in accordance with ASTM D-2176 of 10,000 or more.

The partially-fluorinated resin preferably has a melt flow rate at 265° C. of 0.5 g/10 minutes or more.

The partially-fluorinated resin preferably contains ethylene unit and tetrafluoroethylene unit.

The partially-fluorinated resin preferably further contains hexafluoropropylene unit.

The present disclosure also provides a laminate comprising a partially-fluorinated resin layer containing the partially-fluorinated resin described above and a non-fluororesin layer containing a non-fluororesin.

The laminate preferably contains a polyamide resin layer containing a polyamide resin as the non-fluororesin layer.

It is preferred that the partially-fluorinated resin layer and the polyamide resin layer be adhered and that the interlayer adhesive strength between the partially-fluorinated resin layer and the polyamide resin layer be 30 N/cm or more.

The laminate preferably comprises an ethylene/vinyl alcohol copolymer (EVOH) layer containing an EVOH resin as the non-fluororesin layer.

The present disclosure also provides a multilayer tube famed of the laminate described above.

The present disclosure also provides a monolayer tube containing the partially-fluorinated resin described above.

It is preferred that the inner surface of the tube be famed of the partially-fluorinated resin and that the inner surface have a surface roughness Ra of 1.0 μm or less.

The present disclosure provides a method for producing the tube described above, comprising forming the partially-fluorinated resin at a line speed of 15 m/minute or more to obtain the tube.

EXAMPLES

Next, embodiments of the present disclosure will now be described by way of Examples, but the present disclosure is not limited solely to the Examples.

The numerical values of the Examples were measured by the following methods.

<Polymer Composition>

$^{19}$F-NMR measurement was conducted using pellets of the partially-fluorinated resin obtained in each Example and a nuclear magnetic resonance apparatus AC300 (manufactured by Bruker-Biospin AG) to determine the polymer composition from the integrated values of peaks. Depending on the kind of monomer, the results of elemental analysis were suitably combined to determine the polymer composition.

<Melting Point>

Thermal measurement was conducted using pellets obtained in each Example and a differential scanning calorimeter RDC220 (manufactured by Seiko Instruments Inc.) in accordance with ASTM D 4591 at a temperature-increasing rate of 10° C./min, and the melting point of the partially-fluorinated resin was determined from the peak of the endothermic curve obtained.

<Melt Flow Rate (MFR)>

The mass (g/10 min) of the copolymer flowing out from a nozzle having an inner diameter of 2 mm and a length of 8 mm per 10 minutes at 265° C. or 297° C. under a load of 5 kg was determined as the MFR using pellets obtained in each Example and a melt indexer (manufactured by Yasuda Seiki Seisakusho Ltd.) in accordance with ASTM D 1238.

<Number of Carbonate Groups and Carboxylic Acid Fluoride Groups>

Pellets obtained in each Example were compression-molded at room temperature to produce films having a thickness of 50 to 200 μm. In an infrared absorption spectrum analysis of this film, a peak assigned to the carbonyl group of a carbonate group [—OC(=O)O-] appears at an absorption wavelength of 1817 cm$^{-1}$ [$v_{(O=O)}$], and a peak assigned to the carbonyl group of a carboxylic acid fluoride group [—COF] appears at an absorption wavelength of 1884 cm$^{-1}$ [$v_{(O=O)}$], and thus the absorbance of the $v_{(O=O)}$ peaks was measured. The number of carbonate groups per $10^6$ main-chain carbon atoms of the partially-fluorinated resin was calculated according to the following formula.

Number of carbonate groups or carboxylic acid fluoride groups (per $10^6$ main-chain carbon atoms)=(l×K)/t l: Absorbance K: Correction factor (—OC(=O)O—R: 1426, —COF: 405)

t: Film thickness (mm)

The infrared absorption spectrum analysis was conducted by scanning 40 times using a Perkin-Elmer MIR spectrometer 1760X (manufactured by The Perkin-Elmer Corporation). The obtained IR spectrum was subjected to automatic baseline judgment by Perkin-Elmer Spectrum for Windows Ver. 1.4C to measure the absorbance of the peaks at 1817 cm$^{-1}$ and 1884 cm$^{-1}$. The thickness of the films was measured with a micrometer gauge.

<Storage Elastic Modulus (G')>

Pellets of the partially-fluorinated resin obtained in each Example were used to produce a sheet having a thickness of 2 mm by compression molding at a heating temperature of 230° C. The dependence of the storage elastic modulus on the angular frequency from 100 rad/second to 0.001 rad/second was measured using this sheet by a melt viscoelasticity measurement apparatus MCR-302. The measurement frequency was 5 points/digit at logarithmically equal intervals, the measurement jig was a parallel plate having a diameter of 25 mm, the sample thickness was 0.8 mm (during measurement), the measurement temperature was 230° C., and the amount of strain was 3%.

<Critical Shear Rate>

The shear rate (sec$^{-1}$) when a state was reached where a melt fracture began to occur in a partially-fluorinated resin flowing out from an orifice having a diameter of 1 mm and a length of 16 mm at 260° C. under a shear stress was measured using a Capilograph (manufactured by Bohlin Instruments Ltd.). The melt fracture was confirmed by observing the surface of the partially-fluorinated resin by a microscope at a magnification of 16.

<MIT Repeated Folding Test (Bending Life): Crack Resistance>

The test was conducted in accordance with ASTM D2176. Specifically, a test piece of 15 mm and 130 mm in length was attached to an MIT measurement apparatus (model 12176, manufactured by YASUDA SEIKI SEISAKUSHO, LTD.). The test piece was bent under conditions of a load of 1.25 kg, a left/right folding angle of 135 degrees, and 175 folds/min, and the number of folds for the test piece to break (fold number (MIT repeated number of folds)) was measured.

Example 1 (Production of Partially-Fluorinated Resin A)

380 L of distilled water was placed in an autoclave. After sufficient nitrogen purging, 166 kg of octafluorocyclobutane, 83 kg of HFP, and 0.3 kg of perfluoro(1,1,5-trihydro-1-pentene) (CH$_2$=CF(CF$_2$)$_3$H) were loaded, and the inside of the system was kept at 35° C. and a stirring speed of 200 rpm. Thereafter, TFE was injected up to 0.87 MPa, and further subsequently, Et was injected up to 0.95 MPa. Then, 6.3 kg of di-n-propyl peroxydicarbonate was placed, and polymerization was started. The pressure inside the system decreases as the progress of the polymerization, and thus a gas mixture of TFE/Et/HFP=46/44/10 mol % was continuously supplied to keep the pressure inside the system at 0.95 MPa. Then, perfluoro(1,1,5-trihydro-1-pentene) was continuously loaded up to a total amount of 3.2 kg, and stirring was continued for 23 hours. The pressure was released to atmospheric pressure, and the reaction product was recovered.

The obtained reaction product was cleaned and dried to obtain 250 kg of a partially-fluorinated resin. The powdery partially-fluorinated resin was foiled using a single screw extruder to obtain pellets of the partially-fluorinated resin A.

The partially-fluorinated resin A had the following physical properties.

TFE/ethylene/HFP/perfluoro(1,1,5-trihydro-1-pentene) copolymer

TFE/ethylene/HFP/perfluoro(1,1,5-trihydro-1-pentene)= 45.5/44.4/9.5/0.6 (mol %)

Melting point: 197° C.

Melt flow rate (265° C.): 28.9 g/10 min

Number of carbonate groups and carboxylic acid fluoride groups: 314/10⁶C

Storage elastic modulus G' at 230° C. and angular frequency of 0.0025 rad/second: 0.29 Pa Critical shear rate at 260° C.: 160 sec⁻¹

Fold number measured by MIT test: 108,000

Laminates (multilayer tubes) obtained using the produced partially-fluorinated resin will be described with reference to Examples. The numerical values of the laminates were measured by the following methods.

<Adhesive Strength>

A 1 cm-width test piece was cut off from the tube obtained in Examples and subjected to a 180° delamination test at a speed of 25 mm/min using a Tensilon Universal Tester. The average of 5 local maximum points in the elongation amount—tensile strength graph was determined as the adhesive strength (N/cm).

<Surface Roughness Ra>

A test piece was produced by cutting the tube obtained in Examples, and the surface roughness Ra was measured at a point of the test piece corresponding to the inner surface of the tube. Measurement at 5 measurement points was repeated 3 times using a surface roughness measuring machine (SURFTEST SV-600 manufactured by Mitutoyo Corporation) in accordance with JIS B0601-1994, and the average of the obtained measurements was defined as the surface roughness Ra.

In Examples, the following materials were used in addition to the partially-fluorinated resin A.

Polyamide 12

Vestamid X7297 manufactured by Daicel-Evonik Ltd.

Polyamide 612

Vestamid SX8002 manufactured by Daicel-Evonik Ltd.

Ethylene/vinyl alcohol copolymer resin

F101B manufactured by Kuraray Co., Ltd.

Example 2 (Production of Laminate)

Using a two-component two-layer tube extrusion apparatus equipped with a multimanifold (manufactured by PLABOR Research Laboratory of Plastics Technology Co., Ltd.), polyamide 12 as a layer (B) and the partially-fluorinated resin A as a layer (A) were fed to two extruders, respectively, to mold a two-component two-layer multilayer tube having an outer diameter of 8 mm and an inner diameter of 6 mm, according to the extrusion conditions shown in Table 2. The multilayer tube has a layer arrangement of the layer (A)/layer (B), and the layer (A) is the innermost layer. The evaluation results are shown in Table 2.

Example 3 (Production of Laminate)

Using a five-component five-layer tube extrusion apparatus equipped with a multimanifold (manufactured by PLABOR Research Laboratory of Plastics Technology Co., Ltd.), polyamide 12 as a layer (E), polyamide 612 as layers (B and D), an ethylene/vinyl alcohol copolymer resin as a layer (C), and the partially-fluorinated resin A as a layer (A) were fed to five extruders, respectively, to mold a 5-component 5-layer multilayer tube having an outer diameter of 8 mm and an inner diameter of 6 mm, according to the extrusion conditions shown in Table 2. The multilayer tube has a layer arrangement of the layer (A)/layer (B)/layer (C)/layer (D)/layer (E), and the layer (A) is the innermost layer. The evaluation results are shown in Table 2.

TABLE 2

| | | Example 2 | Example 3 |
|---|---|---|---|
| Layer (A) | Cylinder temperature (° C.) | 260-280 | 260-280 |
| | Adapter temperature (° C.) | 280 | 280 |
| Layer (B) | Cylinder temperature (° C.) | 210-245 | 230-260 |
| | Adapter temperature (° C.) | 245 | 260 |
| Layer (C) | Cylinder temperature (° C.) | | 200-220 |
| | Adapter temperature (° C.) | | 220 |
| Layer (D) | Cylinder temperature (° C.) | | 230-280 |
| | Adapter temperature (° C.) | | 260 |
| Layer (E) | Cylinder temperature (° C.) | | 210-250 |
| | Adapter temperature (° C.) | | 250 |
| Die temperature (° C.) | | 280 | 280 |
| Line speed (m/min) | | 30 | 30 |
| Thickness μm | Layer (A) | 250 | 100 |
| | Layer (B) | 750 | 350 |
| | Layer (C) | | 150 |
| | Layer (D) | | 100 |
| | Layer (E) | | 300 |
| Adhesive strength | | Material fracture | Material fracture |
| Surface roughness Ra (μm) | | 0.03 | 0.12 |

What is claimed is:

1. A laminate comprising:

a partially-fluorinated resin layer/a first polyamide resin layer/an EVOH layer/a second polyamide resin layer/a third polyamide resin layer as an innermost layer/an inner layer/an intermediate layer/an outer layer/an outermost layer, the partially-fluorinated resin layer containing a partially-fluorinated resin, the partially-fluorinated resin having a storage elastic modulus G' of 0.1 Pa or more at a measurement temperature of 230° C. and an angular frequency of 0.0025 rad/second in melt viscoelasticity measurement, the first polyamide resin layer, the second polyamide layer, and the third polyamide layer each independently containing a polyamide resin, one or both of the first polyamide resin layer and the second polyamide layer being polyamide 612, the EVOH layer containing an EVOH resin, the EVOH layer being a non-fluororesin layer that does not contain a fluororesin, the partially-fluorinated resin layer and the first polyamide resin layer are directly adhered to each other, the first polyamide resin layer and the EVOH layer are directly adhered to each other, a thickness of the partially-fluorinated layer, which is the innermost layer, is 0.01 to 0.5 mm, a thickness of the first polyamide layer, which is the inner layer, is 0.01 to 1.0 mm, a thickness of the EVOH layer, which is the intermediate layer, is 0.01 to 0.5 mm, a thickness of the second polyamide layer, which is the outer layer, is 0.01 to 1.0 mm, and a thickness of the third polyamide layer, which is the outermost layer, is 0.01 to 1.0 mm wherein the partially-fluorinated resin has a reactive functional group.

2. The laminate according to claim 1, wherein the partially-fluorinated resin has a critical shear rate at 260° C. within a range of 50 to 500 sec$^{-1}$.

3. The laminate according to claim 1, wherein the partially-fluorinated resin has a fold number measured by MIT test as measured in accordance with ASTM D-2176 of 10,000 or more.

4. The laminate according to claim 1, wherein the partially-fluorinated resin has a melt flow rate at 265° C. of 0.5 g/10 minutes or more.

5. The laminate according to claim 1, wherein the partially-fluorinated resin contains ethylene unit and tetrafluoroethylene unit.

6. The laminate according to claim 5, wherein the partially-fluorinated resin further contains hexafluoropropylene unit.

\* \* \* \* \*